United States Patent [19]
Hollins

[11] 3,904,885
[45] Sept. 9, 1975

[54] MOTOR VEHICLE AIR CONDITIONER CONTROL SYSTEM

[76] Inventor: Jesse R. Hollins, 40 Stoner Ave., Great Neck, N.Y. 11021

[22] Filed: Dec. 3, 1973

[21] Appl. No.: 421,403

[52] U.S. Cl.............. 307/10 R; 62/323; 123/41.15
[51] Int. Cl.². ....................... F25B 27/00; F01P 5/14
[58] Field of Search ............ 62/227, 228, 323, 243; 123/41.15, 41.01; 307/10 R

[56] References Cited
UNITED STATES PATENTS

| | | | |
|---|---|---|---|
| 2,930,365 | 3/1960 | Muscato | 123/41.15 |
| 3,651,658 | 3/1972 | Kushida | 62/228 |

Primary Examiner—Herman Hohauser
Attorney, Agent, or Firm—Kirschstein, Kirschstein, Ottinger & Frank

[57] ABSTRACT

A system for controlling the operation of a motor vehicle air conditioner compressor to prevent overheating of the motor vehicle engine cooling liquid due to air conditioner compressor operation. The system prevents operation of the motor vehicle air conditioner compressor when the engine cooling liquid is above a predetermined temperature and allows said air conditioner compressor to function when said cooling liquid is below the predetermined temperature.

1 Claim, 3 Drawing Figures

MOTOR VEHICLE AIR CONDITIONER CONTROL SYSTEM

BACKGROUND OF THE INVENTION

1. Field of the Invention

Motor vehicle air conditioner control system.

2. Description of the Prior Art

Aside from the few motor vehicles today whose engines are air cooled, most motor vehicle engines are cooled by means of a cooling liquid (e.g. water and/or antifreeze liquid chemicals) which circulates through the engine block and through a radiator. The radiator is located in front of the engine block and the air fan and as the motor vehicle moves a vast volume of air is directed through the fins of the radiator cooling the cooling liquid which is circulated through the radiator and engine block. As a result, the engine block is cooled and not allowed to overheat.

A motor vehicle engine cooling system includes a pressure relief valve which is opened when the temperature of the liquid in the cooling system exceeds a predetermined temperature. The reason for this is that if the radiator is not properly cooling the cooling liquid the temperature of said cooling liquid rises and eventually said cooling liquid is converted to steam with corresponding increases in pressure. To prevent damage, the pressure relief valve opens so that the pressure in the cooling system does not exceed a safe level.

Most cars are now equipped with an air conditioning system which includes, inter alia, a compressor and a condensor. Usually the condensor is located in front of the engine radiator and when the air conditioner compressor is operative the temperature of the condensor increases and thus the temperature of the cooling air increases as the cooling air flows through the condensor fins. Thus the air directed to the radiator fins is at an elevated temperature. This does not present a serious problem when the motor vehicle is moving at substantial velocities and large quantities of ambient air are directed through the condensor fins to the radiator. At low motor vehicle speeds, a substantial problem is created when the air conditioning system is operative. This is a result of the air which flows through the condensor fins being heated so that that air directed through the radiator fins is at an elevated temperature. The problem is serious when the motor vehicle is not moving at substantial velocities since there is a relatively reduced amount of air flowing to the radiator at slow motor vehicle velocities. The problem is compounded for stop-and-go driving which characterizes driving conditions in a substantial number of our urban centers, or when a traffic stoppage occurs.

As a result of overheating, steam is created from the cooling liquid which causes the radiator pressure relief valve to open. Consequently, some of the steam escapes. This requires the motor vehicle operator to stop the motor vehicle to allow the engine to cool. Prior to further operation of the engine, it is necessary that the supply of cooling liquid be supplemented so that there is sufficient liquid in the cooling system to cool the engine. Very frequently when the cooling system overheats and steam is lost there is insufficient cooling liquid in the system after the engine is cooled to properly cool the engine. As will be apparent to those skilled in the art, the problem of an overheated engine is that it results in great inconvenience to the motor vehicle operator and can lead to damage to the motor vehicle engine.

SUMMARY OF THE INVENTION

1. Purposes of the Invention

It is an object of the present invention to provide a system for preventing overheating of the cooling liquid for a motor vehicle internal combustion engine by reason of the operation of the motor vehicle air conditioner system.

Other objects of the invention in part will be obvious and in part will be pointed out hereinafter.

2. Brief Description of the Invention

According to one embodiment of the present invention, the foregoing as well as other objects are accomplished by placing a normally closed thermal sensing means in a position to sense the temperature of the cooling liquid of an internal combustion engine which has an air conditioning system. The thermal sensing means remains closed for all temperatures of said cooling liquid below a predetermined value. If the temperature of the cooling liquid increases above the predetermined value, said thermal sensing means opens. The predetermined temperature value is below the temperature at which the cooling liquid is converted to steam.

The thermal sensing means is wired in series with the air conditioning electrical operated or controlled compressor clutch and controls the engagement and disengagement of said air conditioner compressor clutch. If the temperature of the cooling liquid is below the predetermined level, the thermal sensing means is closed and if the air conditioner control switch is closed the air conditioner compressor clutch is engaged so that the air conditioning system is operative. If the air conditioning switch is closed and the vehicle is moving slowly so that there is a relatively minimum amount of air being directed to the cooling radiator and said air is substantially heated when passing through the condensor fins, the temperature of the cooling liquid will rapidly increase. When the temperature of the cooling liquid reaches the predetermined value, the thermal sensing means opens causing the air conditioner compressor clutch to open. As a result, the air conditioner system is deactivated and the condensor no longer operates so that air directed through the condensor fins is not heated thus increasing the ability of the radiator to cool the cooling liquid. If the motor vehicle speed should increase, there will be increased amounts of air directed through the condensor fins to the radiator fins so that the temperature of the cooling liquid will be reduced and the thermal sensing means will now close allowing the air conditioner compressor clutch to be closed so that the air conditioner system is operative.

From the foregoing it is apparent that the system of the present invention opens the air conditioning compressor clutch when there is danger of overheating the cooling liquid of the engine cooling system.

The invention accordingly consists in the features of construction, combination of elements and arrangement of parts which will be exemplified in the motor vehicle air conditioner control systems hereinafter described and of which the scope of application will be indicated in the appended claims.

DESCRIPTION OF THE PREFERRED EMBODIMENTS

Figure 3:
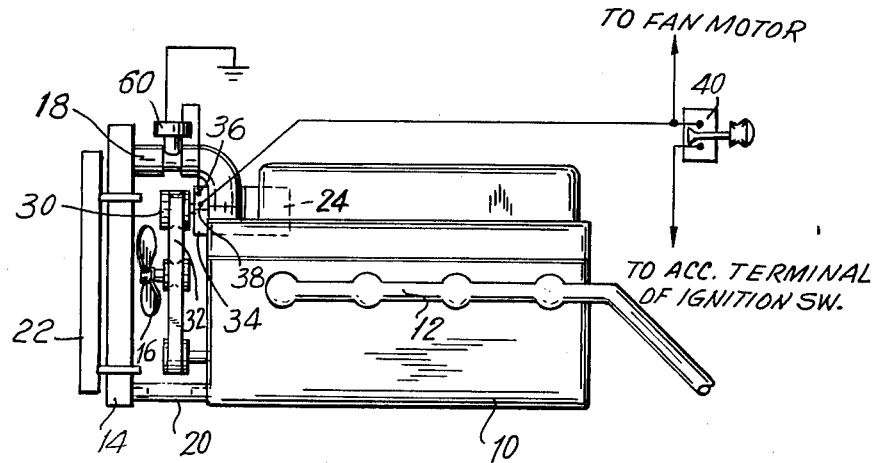
FIG. 3 shows how the thermal sensing means of FIG. 2 can be screwed into an engine block.
Figure 1:
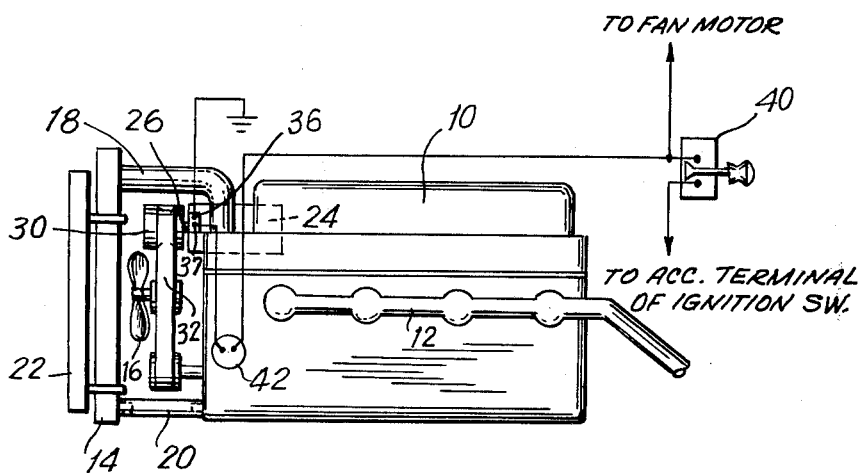
FIG. 1 is a schematic illustration of an embodiment of the present invention.
Figure 2:
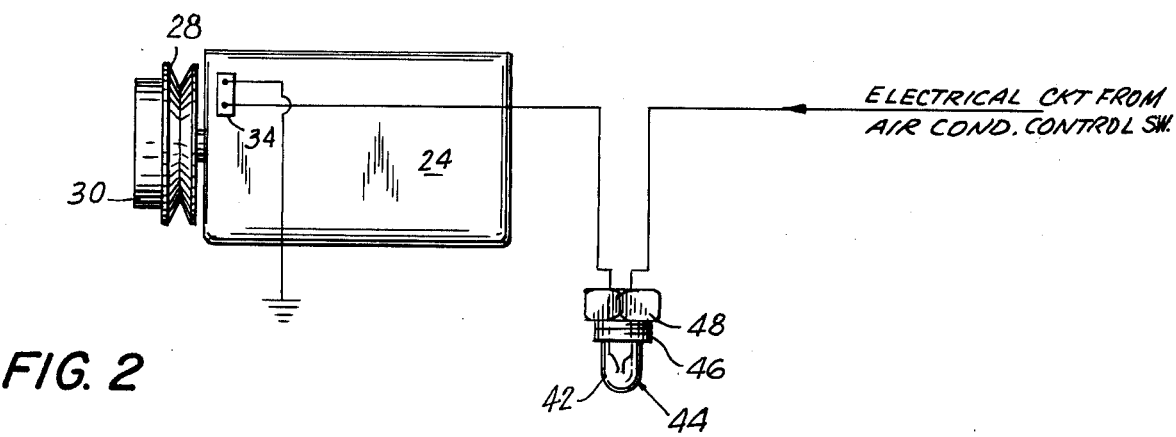
FIG. 2 shows an alternate embodiment of the present invention.

In FIGS. 1, 2 and 3 of the drawings an internal combustion engine 10 is shown which is the type that is liquid cooled, i.e. engine 10 does not rely solely on air for cooling purposes. The particular design of engine 10 is conventional, i.e. known liquid cooled internal combustion engines regardless of design of engine. As is conventional, engine 10 includes an exhaust manifold 12, shown only to distinguish it as an engine.

An engine liquid cooling radiator 14 is provided. Radiator 14 is located in front of fan 16. Fan 16 is driven by engine 10 in the conventional manner and draws air through the fins of engine liquid cooling radiator 14. A liquid coolant flow tube 18 transfers cooling fluid between the engine block and engine liquid cooling radiator 14. A liquid coolant flow tube 20 transfers cooling fluid between engine liquid cooling radiator 14 and the engine block for engine 10. The water pump is not shown.

The motor vehicle in which engine 10 is used includes an air conditioning system with the condensor 22 therefor being located (as is conventional) slightly to the front of engine liquid cooling radiator 14. The air conditioner compressor 24 is located in the engine compartment and rotatable with the drive shaft 26 thereof is a pulley 28.

An air conditioner compressor electrically controlled clutch 30 is provided and when engaged enables compressor 24 to be run by reason of an engine driven belt 32 driving pulley 28. Belt 32 drives pulley 28 in the conventional manner off a pulley associated with the engine crank shaft.

When air conditioner compressor clutch 30 is engaged, rotation of pulley 28 results in rotation of shaft 26. On the other hand, when air conditioner compressor clutch 30 is not engaged, rotation of pulleys 28 does not result in rotation of shaft 26. The air conditioner compressor clutch 30 includes control terminals 36 and 38. The clutch is closed when an electrical potential is applied to terminals 36 and 38.

As shown in FIGS. 1 and 2, an electrical thermal sensing means 42 is provided which includes two terminals. One terminal is connected to air conditioner control switch 40 and the other terminal is connected to terminal 38. Terminal 36 is connected to ground. Thermal sensing means 42 is located in a housing 44. Housing 44 is secured to a screw fitting 46 having a nut (wrench engaging part) 48 on the end thereof. Screw fitting 46 is threaded into a tapped opening in the engine block so that housing 44 is immersed in the engine cooling liquid. Thermal sensing means 42 is closed when below a predetermined temperature and is open when above the predetermined temperature. When the thermal sensing means is open, clutch 30 cannot be closed. The temperature at which normally closed thermal sensing means opens is below the boiling point of the liquid coolant.

In use, if it is desired to have the air conditioner system operational, switch 40 is closed and if the temperature of the cooling fluid is less than the predetermined amount thermal sensing means 42 is closed so that clutch 30 can be closed. As a consequence, the air conditioning system is operational. Continued operation of the air conditioning system results in condensor 22 emitting heat. The air which is directed through the fins of condensor 22 and through the radiator fins cools the liquid coolant. If the vehicle is moving at a very slow speed or is stationary, there is a minimum amount of air which is drawn by fan 16 through condensor fins and radiator fins. The temperature of the air is elevated as a result of the continued operation of the condensor so that liquid cooling radiator 14 is not completely effective in cooling the cooling liquid. Consequently, the temperature of the engine cooling liquid is increased and, if said temperature reaches the predetermined level, thermal sensing means 42 opens so that the clutch is no longer closed and the operation of the compressor is halted. As a result, condensor 22 cools and the air which is directed through the fins of condensor 22 and through the liquid cooling fins of radiator 14 is not heated so that said radiator can effectively cool the cooling liquid. As a consequence, the temperature of the cooling liquid decreases and falls below the predetermined level so that thermal sensing means 42 closed. When this occurs, the air conditioning system again becomes operational.

If the motor vehicle is moving at a relatively high rate of speed considerable quantities of air are directed through the condensor fins and to the liquid cooling radiator fins so that the operation of the air conditioner system has little or no effect insofar as heating the cooling liquid circulating through the engine cooling system.

As a result of the system of the present invention danger of overheating of the engine cooling liquid caused by operation of the air conditioner compressor system at low vehicle speeds is eliminated together with the attendant inconveniences.

As shown in FIG. 3 the normally closed thermal sensing means consists of an electric switch 60 which is in series with terminal 36 and connected to ground. Electric switch 60 is located in liquid flow tube 18. When the temperature of switch 60 is at or below the predetermined value the switch remains closed. When the temperature of switch 60 is above the predetermined value it opens. When 60 is open the clutch cannot be closed by closing switch 40. As noted before, supra, the temperature at which switch 60 opens is below the boiling point of the liquid coolant.

The operation of switch 60 in controlling the system is the same as the operation of the system hereinabove described.

If desired, the thermal sensing means may be self-grounding.

Although the air conditioner compressor clutch will not operate when the engine coolant liquid is above a predetermined temperature the air circulating fan remains in operation continuing to circulate air within the vehicle. The air which is so circulated will have been cooled prior to the air conditioner compressor becoming inactive providing a certain measure of comfort for an extended period of time to passengers inside the vehicle. If desired, the wiring of the thermal sensing means can be such so that when the air conditioner compressor clutch is deactivated the electric fan motor can be deactivated.

It thus will be seen that there is provided a motor vehicle air conditioner control system which achieves the various objects of the invention and which is well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

Having thus described the invention there is claimed as new and desired to be secured by Letters Patent:

1. A motor vehicle air conditioner control system comprising a liquid cooled internal combustion engine, said liquid cooled internal combustion engine including a cooling system in which a liquid medium is used to cool the internal combustion engine, a motor vehicle air conditioning system, an air conditioner control electric switch, a thermal sensing means connected to said air conditioner control electrical switch, said thermal sensing means being a heat sensitive switch that is immersed in said liquid, said heat sensitive switch having two states, said heat sensitive switch being in the first state when the temperature of the cooling liquid is below a predetermined value and in the second state when the temperature of the cooling liquid is above the predetermined value, said motor vehicle air conditioning system including a compressor, an electrically controlled clutch for driving said compressor and electrically connected to said heat sensitive switch, and said clutch being closed when said heat sensitive switch is in the first state and open when said heat sensitive switch is in the second state.

* * * * *